United States Patent [19]

Bridger

[11] 4,141,958
[45] Feb. 27, 1979

[54] PROCESS FOR PRODUCING PHOSPHORIC ACID AND DICALCIUM PHOSPHATE

[75] Inventor: Grover L. Bridger, Atlanta, Ga.

[73] Assignee: Georgia Tech Research Institute, Atlanta, Ga.

[21] Appl. No.: 836,370

[22] Filed: Sep. 26, 1977

Related U.S. Application Data

[63] Continuation of Ser. No. 655,960, Feb. 6, 1976, abandoned, which is a continuation of Ser. No. 437,302, Jan. 28, 1974, abandoned.

[51] Int. Cl.² ............................................. C01F 11/00
[52] U.S. Cl. ...................................... 43/167; 423/320; 423/321 S
[58] Field of Search ............... 423/305, 307, 308, 309, 423/319, 320, 321 R, 321 S, 167

[56] References Cited

U.S. PATENT DOCUMENTS

| | | | |
|---|---|---|---|
| 1,929,442 | 10/1933 | Milligan | 423/321 S |
| 2,181,933 | 12/1939 | Block et al. | 423/309 |
| 2,914,380 | 11/1959 | Vickery | 423/309 |
| 3,118,731 | 1/1964 | Svanoe | 423/317 |
| 3,150,957 | 9/1964 | Seymour et al. | 423/319 |
| 3,410,656 | 11/1968 | Bunia et al. | 423/321 |
| 3,539,291 | 11/1970 | Chiola et al. | 423/307 |
| 3,840,639 | 10/1974 | Drechsel | 423/167 |
| 3,840,640 | 10/1974 | Drechsel | 423/167 |

FOREIGN PATENT DOCUMENTS

| | | | |
|---|---|---|---|
| 1285466 | 6/1968 | Fed. Rep. of Germany | 423/319 |
| 1287054 | 9/1969 | Fed. Rep. of Germany | 423/319 |
| 1089682 | 11/1967 | United Kingdom | 423/307 |

OTHER PUBLICATIONS

Phosphoric Acid, Phosphates, & Phosphate Fertillizers, Waggman et al., 1927, pp. 176 to 178.

Primary Examiner—O. R. Vertiz
Assistant Examiner—Thomas W. Roy
Attorney, Agent, or Firm—Newton, Hopkins & Ormsby

[57] ABSTRACT

Phosphatic raw materials are treated with phosphoric acid to obtain monocalcium phosphate which is dissociated with an organic solvent to yield high grade phosphoric acid and fertilizer grade dicalcium phosphate.

13 Claims, 3 Drawing Figures

FIG. 1

MCP = Monocalcium phosphate
DCP = Dicalcium phosphate
CS = Calcium sulphate
Imp. = Impurities

PROCESS FOR PRODUCING PHOSPHORIC ACID AND DICALCIUM PHOSPHATE

This is a continuation of application Ser. No. 655,960, filed 2/6/76 which was a continuation of application Ser. No. 437,302, filed 1/28/74 both now abandoned.

BACKGROUND OF THE INVENTION

1. Field of the Invention

This invention relates to a process for producing phosphoric acid and dicalcium phosphate. More particularly, the invention provides a process for obtaining relatively pure phosphoric acid and/or impure fertilizer-grade dicalcium phosphate from low-grade phosphatic raw materials as well as from high-grade phosphate rock.

2. Description of the Prior Art

The manufacture of phosphoric acid is conventionally performed on a commercial scale by either the wet process or the thermal process. In the wet process, phosphate rock is treated with sulfuric acid to produce weak aqueous phosphoric acid (20 - 30% $P_2O_5$) and calcium sulfate. The phosphoric acid and calcium sulfate are separated by filtration and the phosphoric acid is concentrated to the desired level (usually 40 to 72% $P_2O_5$). The resulting acid is quite impure and usually black in color. It is suitable primarily for fertilizer manufacture and not for other industrial purposes.

Accordingly, the present commercial wet process for producing phosphoric acid employs the highest grade of phosphate rock obtainable since this results in the lowest impurities content of the resulting acid. However, high grade phosphate rock is becoming very scarce and expensive. In Florida, for example, there is very little phosphate rock available containing as high as 35% $P_2O_5$ but there are large quantities of lower grade phosphate rock containing around 30% $P_2O_5$ and lower. However, use of these lower grade phosphate rocks results in a very impure phosphoric acid which is undesirable for most uses. Also, there are available large quantities of rejected materials from phosphate rock beneficiation such as phosphate slimes containing 12 to 14% $P_2O_5$ and colloidal phosphate containing around 18% $P_2O_5$.

The thermal process consists of the reduction of phosphate rock to elemental phosphorus and the conversion of the elemental phosphorus by oxidation to $P_2O_5$. However, this process is expensive and therefore it is not widely used for fertilizer manufacture.

In addition to obtaining phosphoric acid, various phosphates which are useful in phosphate fertilizers, such as monocalcium phosphate, may also be obtained from phosphate rock by various processes. For example, Ross, et al, U.S. Pat. No. 1,191,615 shows a wet process for producing a concentrated fertilizer by which monocalcium phosphate is obtained from phosphate rock by utilizing sulfuric and phosphoric acids.

Monocalcium phosphate may also be obtained from phosphate rock by subjecting the ground raw material to sulfur dioxide in the presence of water as disclosed in the patent to Blumenberg, U.S. Pat. No. 1,251,741.

Another method of obtaining monocalcium phosphate from phosphate rock is disclosed in U.S. Pat. No. 2,914,380 to Vicheng. According to this process, crude phosphate material is treated with phosphoric acid to produce a water soluble product which is readily separated from any insoluble residual material. Pure monocalcium phosphate may then be obtained by extracting the phosphoric acid from this solution with an organic solvent, such as butanol. When the phosphoric acid concentration in the aqueous phase has been sufficiently diminished, the monocalcium phosphate precipitates.

It is also known that monocalcium phosphate undergoes a dissociation reaction to form phosphoric acid and dicalcium phosphate as follows:

$$Ca(H_2PO_4)_2 \rightarrow H_3PO_4 + CaHPO_4 \qquad (3)$$

The extent to which this reaction goes to the right depends upon various conditions. K. L. Elmore and T. D. Farr, reported in *Industrial and Engineering Chemistry*, Volume 32, pages 580 - 6, April 1940, that in aqueous systems high temperatures and high concentrations of monocalcium phosphate favor high conversion of monocalcium phosphate to phosphoric acid and dicalcium phosphate. It was also reported by Andre Boulle and Armelle de Sallier Dupin in *Compt. rend.* Vol. 248, pages 1669-72 (1959) that the above reaction takes place to a substantial extent in the presence of many organic compounds, including ethanol, acetone, dioxane, tetrahydrofuran and pyridine.

SUMMARY OF THE INVENTION

Accordingly, one object of this invention is to provide a process for obtaining relatively pure phosphoric acid from phosphate rock.

Another object of this invention is to provide a process for obtaining fertilizer grade dicalcium phosphate.

Yet another object of this invention is to provide a process which simultaneously produces fertilizer grade dicalcium phosphate and relatively pure phosphoric acid.

Yet another object of this invention is to provide a process for obtaining phosphoric acid and/or dicalcium phosphate in which the sulfuric acid requirement for its production is very much less than that for the production of an equivalent amount of available $P_2O_5$ by other known processes.

Still another object of this invention is to provide a process for producing high-purity phosphoric acid from low-grade phosphatic raw materials in a commercially acceptable manner.

Briefly, these and other objects of the invention, as hereinafter will become more readily apparent, have been achieved by treating phosphatic raw materials to obtain monocalcium phosphate and then dissociating the monocalcium phosphate to form phosphoric acid and dicalcium phosphate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In one aspect of the present invention, a portion of the phosphatic raw materials is initially treated with sulfuric acid to convert the phosphate content to crude phosphoric acid. This crude phosphoric acid is then used to treat the remaining portion of the phosphate to yield monocalcium phosphate.

The first two steps in the process (Steps A and B in FIGS. 1, 2 and 3) are substantially standard wet process phosphoric acid plants, without phosphoric acid concentration. It will be recognized that such wet processes are much more complex than shown in FIGS. 1, 2 and 3, which show only two steps for simplicity. Standard wet processes for producing phosphoric acid are described in Phosphoric Acid, Edited by A. V. Slack, Marcel Dekker, Inc., New York, 1968.

Suitable phosphatic raw materials which are useable in this invention include phosphate rock of all grades and low grade phosphatic by-products and phosphatic materials rejected as waste materials from beneficiation processes such as slimes and washings.

It is preferred to use the acid in the form of an aqueous solution having a concentration of from 50 to 100% by weight. In practice sulfuric acid enters the process as a 93%, by weight, concentration and is diluted, prior to its reaction, with the rock.

The acid to phosphate raw material ratio should be such that all of the calcium content of the phosphate raw material is converted to calcium sulfate. It is preferable to utilize a slight molar excess of sulfuric acid so that all the calcium content of the phosphate rock is removed therefrom. The excess sulfuric acid, however, is not detrimental to the process because sulfuric acid is insoluble in the organic solvent and, therefore, will not contaminate the resulting product.

The crude phosphoric acid is produced by mixing the phosphatic raw materials with the acid at a temperature of from 100° F. to 300° F. and preferably from 165° F. to 190° F. The phosphatic raw materials thus treated decomposes to obtain crude, impure or dirty phosphoric acid and insoluble products depending upon the composition of the phosphatic raw materials and acid use. The insoluble products may be readily separated from the crude phosphoric acid by filtration or the like.

The thus separated insolubles, which includes calcium sulfate are discarded.

The thus obtained crude phosphoric acid has a concentration of about from 20% $P_2O_5$ to 30% $P_2O_5$ which, of course, may be concentrated to any degree required. The crude phosphoric acid is predominately ortho phosphoric acid.

The thus obtained aqueous phosphoric acid having a concentration of from 20% $P_2O_5$ to 30% $P_2O_5$ and preferably from 28% $P_2O_5$ to 30% $P_2O_5$ is reacted by mixing it at a temperature of from 100° F to 300° F and preferably from 130° F. to 200° F., with the pulverized to −100 mesh phosphatic raw materials. The amount of acid used depends upon its concentration and the amount of $P_2O_5$ and CaO in the raw material. In any case, sufficient acid should be used to obtain a mole ratio of $P_2O_5$ to CaO in the final product of about 0.8 to 1.2 and preferably from 0.9 to 1.1, most preferably a ratio of about 1.0 is desired.

The reaction product obtained by reacting the crude aqueous phosphoric acid with the phosphatic raw material is a slurry containing crude monocalcium phosphate. The thus obtained monocalcium phosphate slurry may be dried to form a thick paste or a solid product of monocalcium phosphate. The amount of water contained in these products, including water of crystallization, may vary greatly. However, it is desirable to have a water content of from about 0.3% to 20% and preferably from about 0.5% to 12%.

The resulting slurry, paste or solid monocalcium phosphate containing reation product is then dissociated by mixing with an organic solvent in which phosphoric acid has a relatively high solubility and the resulting dicalcium phosphate has a relatively low solubility.

Suitable solvents include methanol, ethanol, acetone, n-propanol, n-butanol, 3-methyl butanol, n-hexanol, n-octanol, i-octanol, 2-ethyl hexanol, n-decanol, i-decanol, methyl n-butyl ketone, tetrahydrofuran and the like. The solvents may be used alone or in admixtures, if desired. Methanol, acetone, ethanol, n-propanol, n-butanol, n-decanol and tetrahydrofuran are the preferred solvents. Proper selection of mixtures of solvents, at this stage, could result in varying the distribution of the impurities in the resulting phosphoric acid.

The amount of solvent used may vary over wide proportions depending on the reaction (dissociation) conditions and desired degree of purity of the product phosphoric acid. However, the solvent is generally used in an amount of from about 1 to about 25 parts per part of $P_2O_5$ in the initial monocalcium phosphate. Preferably from 3 to 7 parts per part $P_2O_5$ in the monocalcium phosphate are used.

The time and temperature of the dissociation reaction may also vary over a wide range. However the temperature of the reaction may be from 60° F to the boiling temperature of the solvent and preferably near the boiling temperature. If it is desired to operate under pressure, the temperature could be higher than the atmospheric boiling temperature of the solvent. The reaction time may be from 5 minutes to 2 hours and preferably from 15 minutes to 1 hour.

The monocalcium phosphate is dissociated by the organic solvent into phosphoric acid and dicalcium phosphate. Since the organic solvent is a relatively good solvent for the phosphoric acid and a relatively poor solvent for the dicalcium phosphate, the dicalcium phosphate and phosphoric acid may be readily separated by well known techniques such as filtration and the like. Also, the separated phosphoric acid containing organic solvent portion may be treated by well known techniques including such as by boiling or evaporation to separate the acid from the organic solvent and water. The organic solvent is separated from the water by fractional distillation. The separated organic solvent can then be recycled to dissociate more monocalcium phosphate. Also, the produced dicalcium phosphate may be recycled and used as a phosphate raw material to produce only phosphoric acid as the final product or the produced phosphoric acid may be recycled to obtain only dicalcium phosphate as the final product.

The process of the present invention takes advantage of the dissociation reaction of monocalcium phosphate which dissociates to form phosphoric acid and dicalcium phosphate in an organic solvent. This process offers the advantage that a relatively pure phosphoric acid can be produced simultaneously with fertilizer grade dicalcium phosphate, or by choice of recycle streams, pure phosphoric acid in high yields or fertilizer grade dicalcium phosphate may be obtained in high yields in which case the sulfuric acid consumption is much less than that of conventional processes.

In addition, because the impurity content of the phosphoric acid prepared by the dissociation of monocalcium phosphate depends solely on the solubility of the impurities in the organic solvent and not on the total quantity of impurities present in the phosphatic raw material, the process of the present invention will produce substantially as low an impurity containing phosphoric acid from low-grade phosphatic raw materials as from high-grade phosphate rock. Accordingly, the process of this invention may utilize low-grade phosphatic raw materials to obtain high purity phosphoric acid without the necessity of extensive purification steps thereby providing high-grade phosphoric acid from low grade phosphate by an economical and commercially acceptable process.

If dicalcium phosphate could be made by conversion of phosphate rock with sulfuric or phosphoric acid, either directly or indirectly, there would be a considerably lower acid consumption than for presently used conventional commercial fertilizers, the following reactions being theoretical:

$$Ca_{10}F_2(PO_4) + 4H_2SO_4 = 6CaHPO_4 + 4CaSO_4 \ 2HF \quad (1)$$

$$Ca_{10}F_2(PO_4)6 + 4H_3PO_4 = 10CaHPO_4 + 2HF \quad (2)$$

These reactions, in fact, do not proceed under practical or economical conditions, although much research has been devoted to making them proceed.

In reaction (1), the stoichiometric amount of sulfuric acid (100% $H_2SO_4$) required to produce one pound of dicalcium phosphate is 0.477 pound, which is equivalent to 0.920 pound of sulfuric acid (100% $H_2SO_4$) per pound of available $P_2O_5$ in the product. In reaction (2), the stoichiometric amount of phosphoric acid (100% $H_3PO_4$) required to produce one pound of dicalcium phosphate is 0.477 pound. Since about 1.96 pounds of sulfuric acid (100% $H_2SO_4$) are required to produce one pound of phosphoric acid (100% $H_3PO_4$) in commercial practice, the equivalent amount of sulfuric acid to produce one pound of dicalcium phosphate by reaction (2) is 0.52 pound or the amount required to produce one pound of available $P_2O_5$ in the product dicalcium phosphate is 1.08 pounds.

The sulfuric acid requirement for production of the dicalcium phosphate as the sole product can be calculated from the results shown in Tables 1, 2, 3 and 4, when a single staged association is carried out under conditions that give a 70% conversion of monocalcium phosphate to dicalcium phosphate and sulphuric acid, the sulphuric acid requirement is 1.50 lbs. of 100% $H_2SO_4$ per pound of available $P_2O_5$ in the product, which is equivalent to 1.46 lbs. of 100% $H_2SO_4$ per pound of the $P_2O_5$ in the total phosphate rock entering the process. When a three staged association is carried out under conditions that give a 90% conversion of monocalcium phosphate to dicalcium phosphate and phosphoric acid, the sulphuric acid requirement is 1.43 lbs. of 100% $H_2SO_4$ per pound of available $P_2O_5$ in the product, which is equivalent to 1.41 lbs. of 100% $H_2SO_4$ per pound of the $P_2O_5$ in the total phosphate rock entering the process. These sulphuric acid requirements are considerably less than those for conventional fertilizers.

These amounts are much lower in comparison with the amounts of sulfuric acid required to produce a pound of $P_2O_5$ in conventional phosphate fertilizer such as normal superphosphate, triple superphosphate and ammonium phosphates. Typical sulfuric acid consumptions for the conventional fertilizers are as follows: 1.76 pounds of sulfuric acid (100% $H_2SO_4$) per pound of available $P_2O_5$ in normal superphosphate, 2.01 pounds of sulfuric acid (100% $H_2SO_4$) per pound of available $P_2O_5$ in triple superphosphate and 2.70 pounds of sulfuric acid (100% $H_2SO_4$) per pound of available $P_2O_5$ in ammonium phosphates.

If reactions (1) and (2) could be achieved with 95% yield of dicalcium phosphate, either directly as written or indirectly by intermediate reactions, then the sulfuric acid consumption to produce one pound of available $P_2O_5$ in the various fertilizers follows:

| Product | Sulfuric acid consumption, lb. 100% $H_2SO_4$ per lb. available $P_2O_5$ |
|---|---|
| Dicalcium phosphate by Reaction (1) | 0.97 |
| Dicalcium phosphate by Reaction (2) | 1.14 |
| Normal superphosphate | 1.76 |
| Triple superphosphate | 2.01 |
| Ammonium phosphates | 2.70 |

It is evident that major savings in sulfuric acid consumption would be achieved from production of available $P_2O_5$ by Reactions (1) and (2). Although reactions (1) and (2) do not proceed under practical conditions, the net effect of my new process is to achieve substantially the same results as in reaction (1) by a combination of three intermediate reactions as shown below which together with recycling of phosphoric acid, yield dicalcium phosphate with about the same sulfuric acid consumption as reaction (1).

Figure 1:
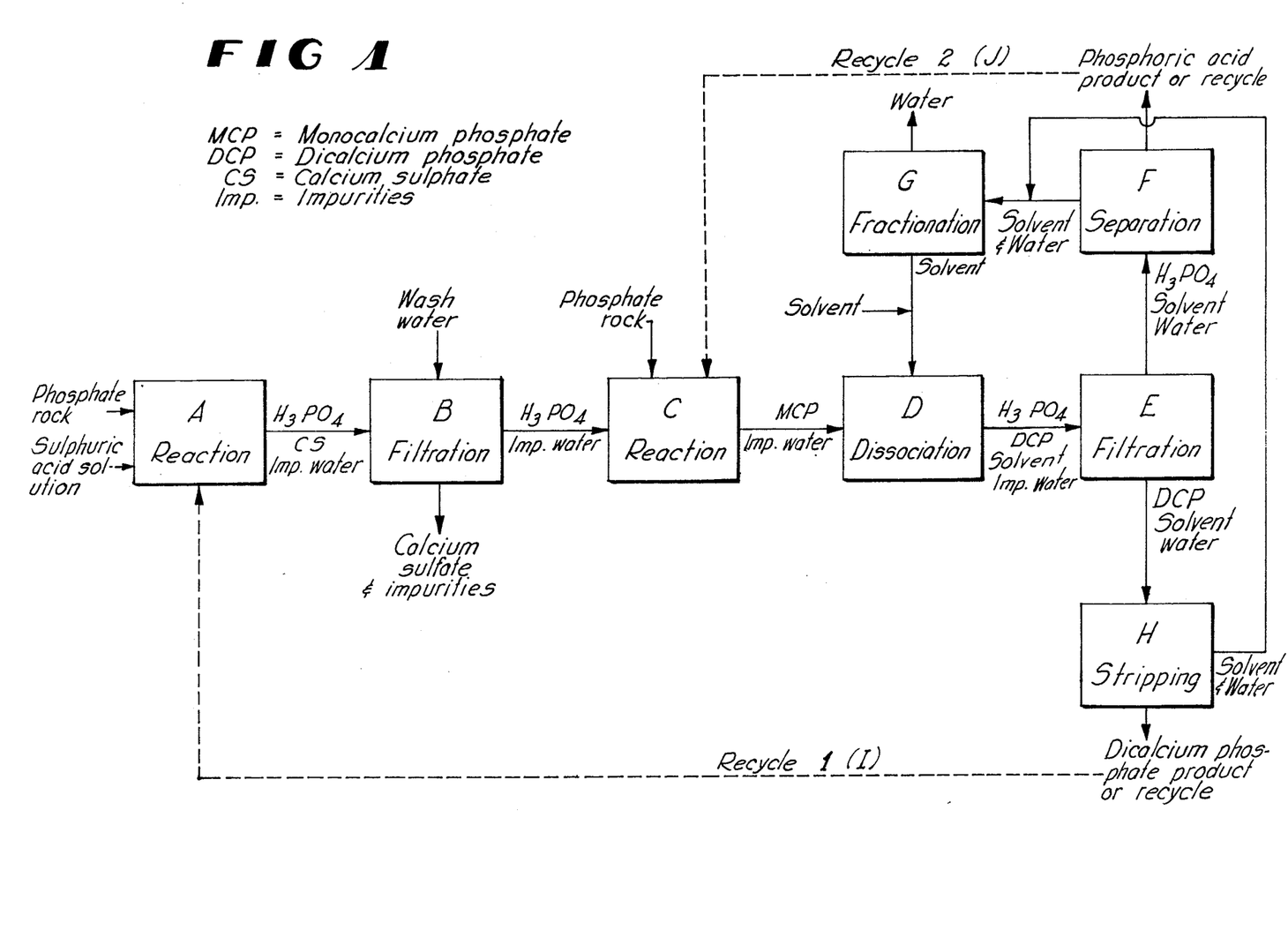
FIG. 1 schematically represents a process for the production of pure phosphoric acid and impure dicalcium phosphate.

A general flow diagram for the process of the present invention is shown in FIG. 1. The process consists of the following steps, which are described below:

A. Reaction of phosphate rock (and sometimes recycled dicalcium phosphate) with sulfuric acid to form crude phosphoric acid and calcium sulfate. The principal reactions in this step are:

$$Ca_{10}F_2(PO_4)_6 + 10H_2SO_4 \rightarrow 6H_3PO_4 + 10CaSO_4 + 2HF, \quad (4)$$

and $$CaHPO_4 + H_2SO_4 \rightarrow H_3PO_4 + CaSO_4. \quad (5)$$

The calcium sulfate and the dicalcium phosphate may be hydrated, depending on reaction conditions. Various phosphate rocks may be used including low grade phosphate, i.e. containing less than 35% $P_2O_5$. Also phosphate slimes containing from 12 to 14% $P_2O_5$ from phosphate rock beneficiation and colloidal phosphate containing about 18% $P_2O_5$ may be used in this step as well as in Step (C.) below.

B. Filtration of the reaction products to remove insoluble calcium sulfate and impurities, with washing of the filter cake with water and recycling the washings to step A.

C. Reaction of the crude phosphoric acid with phosphate rock to produce monocalcium phosphate. The ratio of phosphoric acid to phosphate rock is such that a $P_2O_5$ to CaO mole ratio is about 1.0. The reaction product is a slurry unless the phosphoric acid is concentrated, in which case it is a solid product practically identical to triple superphosphate. The principal reaction in this step is:

$$Ca_{10}F_2(PO_4)_6 + 12H_3PO_4 = 9Ca(H_2PO_4)_2 + CaF_2. \quad (6)$$

The monocalcium phosphate may be hydrated, depending on reaction conditions.

D. Dissociation of the monocalcium phosphate with and organic solvent which dissolves the phosphoric acid but not the dicalcium phosphate or impurities. The principal reaction in this step is:

$$Ca(H_2PO_4)_2 = CaHPO_4 + H_3PO_4. \quad (3)$$

E. Filtration of the dissociation products to separate a solution of pure phosphoric acid in the organic solvent and water from the solid dicalcium phosphate containing impurities. Washing of the filter cake may be carried out; and the washings may be recycled to Step D.

F. and G. Separation of pure phosphoric acid, solvent and water by evaporation and fractional distillation.

H. Stripping of the occluded organic solvent and water from the dicalcium phosphate and recovering it for recycle to step G.

The process as described above produces two products, namely, a relatively pure phosphoric acid which would be suitable for fertilizer production and many industrial applications, and an impure dicalcium phosphate which would be suitable for a fertilizer.

Alternatively, however, the process can be used to produce only one product if desired, namely, either pure phosphoric acid or impure dicalcium phosphate. If only pure phosphoric acid is desired, all of the dicalcium phosphate is recycled to step A as indicated by the dotted line labeled Recycle 1 of FIG. 1. In this case the dicalcium phosphate is converted back to crude phosphoric acid and calcium sulfate, and the impurities are removed in step B with the calcium sulfate.

If only dicalcium phosphate is desired, all of the phosphoric acid is recycled to step C as indicated by the dotted line labeled Recycle 2 where it is converted to monocalcium phosphate. In this case no dicalcium phosphate would be recycled.

It is therefore clear that by the choice of recycle streams the product from the process could consist of only phosphoric acid, only dicalcium phosphate or any proportion of the two.

The process may be operated with dissociation of a monocalcium phosphate slurry in Step D as described above, or with dissociation of a solid monocalcium phosphate, in which case water is evaporated from the crude phosphoric acid from Step B or from the monocalcium phosphate slurry from Step C or both. The choice as to whether water should be evaporated or not will depend on several factors, such as type of dissociation equipment to be used, concentration and purity of phosphoric acid desired, and the like.

Figure 2:
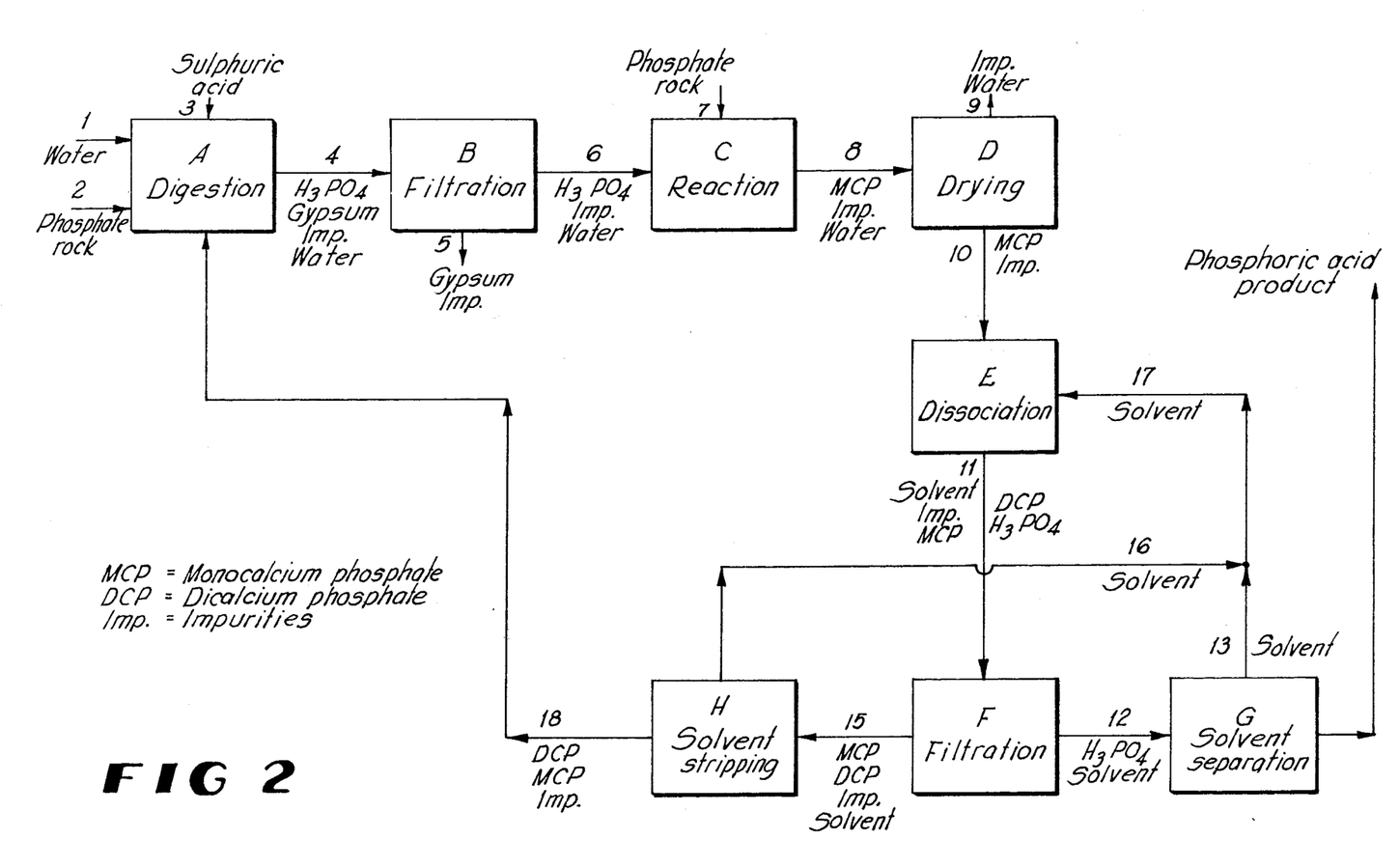
FIG. 2 schematically represents a process in which only phosphoric acid is obtained; and, FIG. 3 which schematically represents a process in which only dicalcium phosphate is obtained.

An example of a process based on the solvent-dissociation reaction in which phosphoric acid is the sole product is shown in FIG. 2. In this example the crude monocalcium phosphate is dried to about 47%$P_2O_5$ content before dissociation. After removal of the solvent, the product phosphoric acid would contain about 54%$P_2O_5$, which is the concentration of most commercial phosphoric acid, and would be much lower in impurity content than most commercial phosphoric acid. It should be noted that this result is achieved without use of an acid concentration step, which is an expensive and troublesome operation.

The principal advantages of this process over conventional wet processes are (1) lower impurity content of the product phosphoric acid, (2) direct production of concentrated phosphoric acid (54%$P_2O_5$) without concentration of the acid by vacuum evaporation of otherwise and (3) optional simultaneous production of fertilizer grade dicalcium phosphate.

Figure 3:
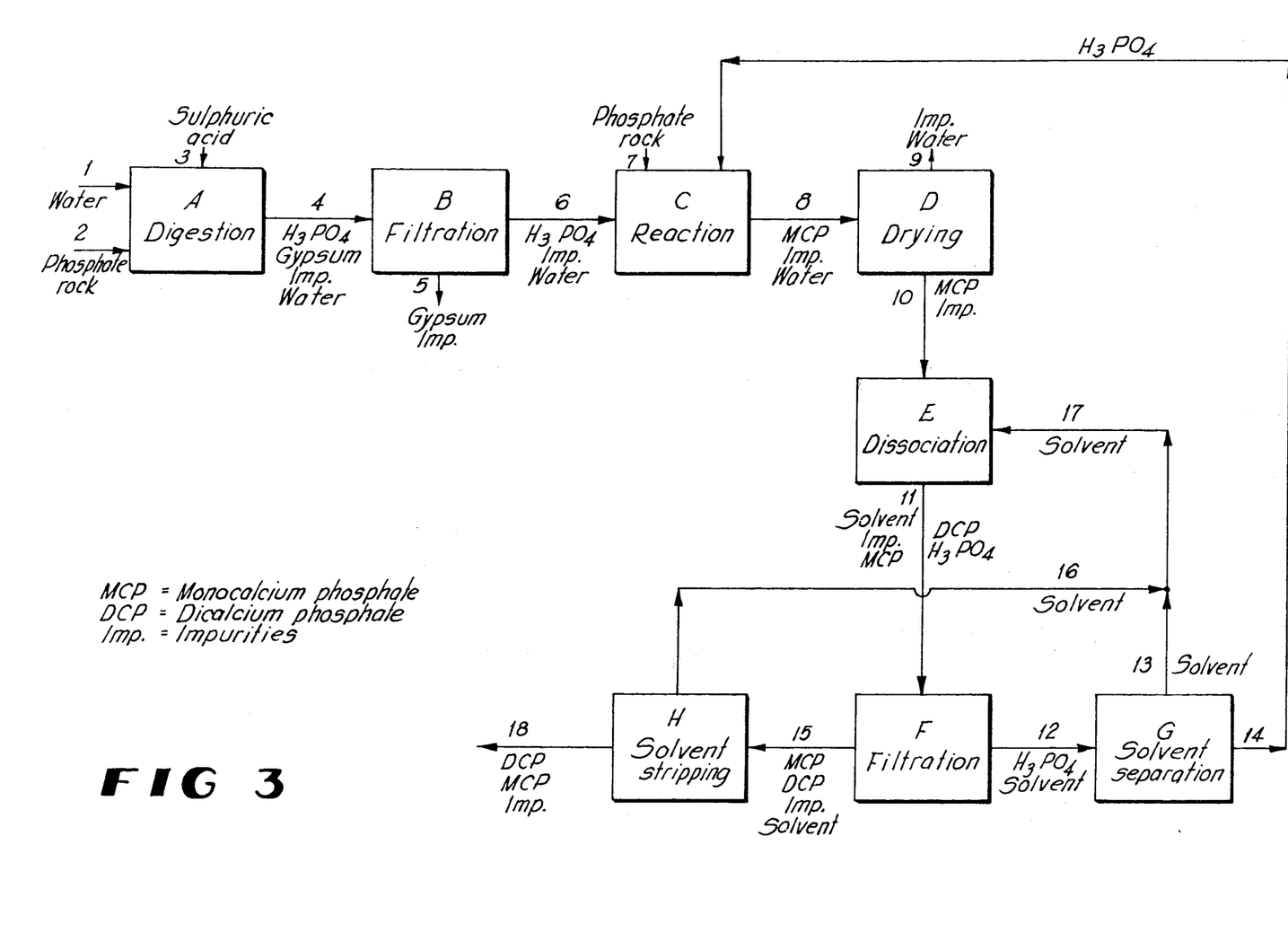

An example of a process based on the solvent-dissociation reaction in which dicalcium phosphate is the sole product is shown in Fig. 3. The product in the flowsheet shown would contain a substantial content of undissociated monocalcium phosphate, and would therefore contain a certain amount of water-soluble $P_2O_5$. This could be reduced to a lower level by the inclusion of additional dissociation steps in which the solid product is further treated with solvent.

The principal advantages of this process over conventional processes for production of fertilizer-grade dicalcium phosphate are (1) much lower consumption of sulfuric and phosphoric acid, (2) control of water solubility of the $P_2O_5$ in the product by controlling its monocalcium phosphate content and (3) optional simultaneous production of low-impurity phosphoric acid.

A further variation of a process for producing impure dicalcium phosphate as the sole product is elimination of the filtration step B in FIG. 3, thereby allowing the gypsum and other impurities to remain in the reaction streams and eventually leave the process as a constituent of the product. This would reduce cost of operating the process in that gypsum filtration equipment and operation would be omitted. The product would not be as concentrated in $P_2O_5$ but for some applications this would not be a great disadvantage.

Having generally described the invention, a more complete understanding can be obtained by reference to certain specific examples, which are included for purposes of illustration only and are not intended to be limiting unless otherwise specified.

EXAMPLES

Preparation of Crude Phosphoric Acid

Pulverized Florida phosphate rock containing 34.3%$P_2O_5$, 49.5%CaO, 0.25% MgO, 1.33%$Fe_2O_3$, 1.28%$Al_2O_3$, and 3.84%F was treated with sulfuric acid at 75° to 80° C and the reaction product was filtered. The resulting phosphoric acid contained 31.0%$P_2O_5$, 0.13%CaO, 0.30%MgO, 1.18%$Fe_2O_3$, 0.66%$Al_2O_3$ and 1.91%F.

In similar manner, another batch of phosphoric acid was prepared from a North Carolina phosphate rock containing 32.9%$P_2O_5$, 54.0%CaO, 0.27%MgO, 0.87%$Fe_2O_3$, 0.80%$Al_2O_3$ and 3.99%F; this acid contained 26.9%$P_2O_5$, 0.10%CaO, 0.52%MgO, 2.09%$Fe_2O_3$, 1.47%$Al_2O_3$ and 1.30%F.

Preparation of Crude Monocalcium Phosphate

The crude phosphoric acid thus obtained was reacted with additional phosphate rock in the proportion required to result in a final mole ratio of CaO to $P_2O_5$ of about 1.00.

Of course, the crude phosphoric acid could come from another source, but it is preferred to obtain it from the same phosphate rock subsequently treated for economical reasons.

The resulting product was a slurry of crude monocalcium phosphate. Some of the monocalcium phosphate slurry was dried to various degrees to give thick pastes and solid products. The product made from Florida rock contained 31.9%$P_2O_5$, 13.1%CaO, 0.21%MgO, 1.20%$Fe_2O_3$, 0.98%$Al_2O_3$ and 2.46%F. The product made from North Carolina rock contained (after drying) 46.6%$P_2O_5$, 19.4%CaO, 0.80%MgO, 2.54%$Fe_2O_3$, 1.83%$Al_2O_3$, and 1.32%F.

Dissociation of Crude Monocalcium Phosphate with Various Organic Solvents

The crude monocalcium phosphate made from Florida phosphate rock was treated with various organic solvents at different temperature and for various periods of time. The product phosphoric acid was separated from the insoluble residue by filtration. The results are shown in Table I. The degree of dissociation is expressed as the %$P_2O_5$ yield in the product acid (the filtrate) based on the total $P_2O_5$ in the initial monocalcium phosphate. It is apparent from reaction (3) that if the dissociation were complete, the yield of $P_2O_5$ in the product phosphoric acid would be 50%.

Table I shows that the %$P_2O_5$ yield in the acid varies depending on the solvent used. The maximum yields were obtained with methanol, acetone, ethanol, n-propanol, n-butanol, n-decanol and tetrahydrofuran. Other solvents gave lower yields. In most cases the dissociation reaction reached equilibrium in ¼ to ½ hours. Temperature has a minor effect on the reaction in most cases and the temperature may vary over a wide range. The maximum $P_2O_5$ yield of about 35% corresponds to a theoretical yield of about 70%.

The impurity content of the product acids varied significantly with the solvent used. For example, methanol produced acids are relatively high in CaO and MgO but relatively low in $Fe_2O_3$ and $Al_2O_3$. Acetone produced acids are relatively low in CaO, MgO, $Fe_2O_3$ and $Al_2O_3$.

Table 1

Variation of $P_2O_5$ Yield and Impurity Concentration with Reaction Time for Phosphoric Acid from the Dissociation of Crude Monocalcium Phosphate with Various Organic Solvents. (The crude MCP was prepared from Florida phosphate rock.)

| Solvent | Percent Total $P_2O_5$ in Unreacted MCP* | Pounds of Solvent Per Pound of Total $P_2O_5$ in Unreacted MCP | Reaction Temperature, °C. | Reaction Time, Hours | $P_2O_5$ Yield in Product Acid, Percent | Percent Impurity in Product Acid Containing 54 Percent $P_2O_5$ | | | |
|---|---|---|---|---|---|---|---|---|---|
| | | | | | | CaO | $Fe_2O_3$ | $Al_2O_3$ | MgO |
| Methanol | 31.86 | 6.35 | 25 | 0.25 | 32.9 | 1.16 | 0.07 | 0.21 | 0.80 |
| | | | | 0.50 | 32.1 | 1.02 | 0.07 | 0.31 | — |
| | | | | 2.00 | 32.9 | 0.82 | 0.09 | 0.32 | — |
| | | | | 4.00 | 29.4 | 0.94 | 0.08 | 0.28 | — |
| Methanol | 31.86 | 6.30 | 55 | 0.25 | 36.5 | 0.83 | 0.06 | 0.19 | 0.70 |
| | | | | 0.50 | 33.2 | 0.80 | 0.08 | 0.20 | — |
| | | | | 1.00 | 33.4 | 0.67 | 0.08 | 0.15 | — |
| | | | | 2.00 | 35.8 | 0.64 | 0.087 | 0.17 | — |
| | | | | 4.00 | 35.7 | 0.71 | 0.08 | 0.17 | — |
| Ethanol | 31.86 | 6.15 | 55 | 0.25 | 26.7 | <0.21 | 0.07 | 0.43 | 0.14 |
| | | | | 0.50 | 27.3 | <0.27 | 0.07 | 0.39 | 0.32 |
| | | | | 1.00 | 27.9 | <0.22 | 0.06 | 0.22 | — |
| | | | | 2.00 | 26.5 | <0.28 | 0.06 | 0.21 | — |
| | | | | 7.00 | 30.3 | <0.18 | 0.06 | 0.21 | — |
| Ethanol | 31.86 | 6.27 | 70 | 0.25 | 36.6 | <0.23 | 0.07 | 0.32 | 0.21 |
| | | | | 0.50 | 28.8 | <0.22 | 0.13 | 0.57 | 0.25 |
| | | | | 1.00 | 31.6 | <0.17 | 0.30 | 0.36 | — |
| | | | | 2.00 | 28.7 | <0.18 | 0.04 | 0.24 | — |
| | | | | 4.00 | 29.4 | <0.17 0.04 | 0.23 | — | |
| | | | | 8.00 | 28.9 | <0.16 | 0.04 | 0.29 | — |
| Normal Propanol | 31.86 | 6.29 | 25 | 0.25 | 33.8 | <0.10 | 0.05 | 0.11 | — |
| | | | | 0.50 | 30.7 | <0.10 | 0.10 | 0.21 | — |
| | | | | 2.00 | 29.1 | <0.09 | 0.10 | 0.20 | — |
| | | | | 8.00 | 29.1 | <0.10 | 0.10 | 0.17 | 0.26 |
| Normal Propanol | 31.86 | 6.31 | 70 | 0.33 | 27.8 | <0.11 | 0.09 | 0.26 | 0.15 |
| | | | | 0.50 | 31.0 | <0.10 | 0.06 | 0.26 | — |
| | | | | 2.00 | 30.7 | 0.13 | 0.07 | 0.03 | — |
| | | | | 9.00 | 27.3 | 0.11 | 0.06 | 0.33 | — |
| Normal Butanol | 31.86 | 6.28 | 25 | 0.25 | 23.6 | <0.12 | 0.07 | 0.32 | 0.02 |
| | | | | 0.50 | 24.7 | <0.11 | 0.07 | 0.21 | — |
| | | | | 4.00 | 24.8 | <0.11 | 0.07 | 0.14 | — |
| Normal Butanol | 31.86 | 6.29 | 70 | 0.25 | 23.7 | <0.12 | 0.05 | 0.29 | 0.04 |
| | | | | 0.50 | 27.7 | <0.12 | 0.16 | 0.19 | 0.05 |
| | | | | 4.00 | 25.9 | <0.11 | 0.03 | 0.32 | — |
| Isoamyl Alcohol (85%) | 31.86 | 6.29 | 40 | 0.25 | 14.9 | <0.18 | 0.06 | 0.41 | 0.05 |
| | | | | 0.50 | 15.7 | <0.18 | 0.04 | 0.54 | — |
| | | | | 4.00 | 15.1 | <0.18 | 0.04 | 0.12 | — |
| Normal Hexanol | 31.86 | 6.31 | 70 | 0.25 | 9.9 | <0.30 | 0.09 | 1.48 | 0.02 |
| | | | | 0.50 | 11.1 | <0.26 | 0.07 | 0.56 | 0.03 |
| | | | | 1.00 | 13.1 | <0.28 | 0.10 | 0.46 | — |
| | | | | 2.00 | 12.2 | <0.23 | 0.07 | 0.49 | — |
| | | | | 4.00 | 14.1 | <0.19 | 0.10 | 0.57 | — |
| | | | | 11.00 | 20.6 | <0.17 | 0.04 | 0.36 | — |
| Normal Hexanol | 47.00 | 6.17 | 70 | 0.25 | 11.1 | 0.19 | 0.54 | 0.38 | 0.28 |
| | | | | 0.50 | 10.8 | 0.15 | 0.53 | 1.11 | — |
| | | | | 1.00 | 12.8 | 0.15 | 0.43 | 0.58 | — |
| | | | | 2.00 | 14.7 | 0.12 | 0.55 | 0.60 | — |
| | | | | 4.00 | 12.3 | 0.11 | 0.52 | 0.85 | — |
| 2-Methyl Pentanol | 32.58 | 6.16 | 70 | 2.00 | 1.7 | 5.76 | 3.04 | 3.54 | — |

Table 1-continued

Variation of $P_2O_5$ Yield and Impurity Concentration with Reaction Time for Phosphoric Acid from the Dissociation of Crude Monocalcium Phosphate with Various Organic Solvents. (The crude MCP was prepared from Florida phosphate rock.)

| Solvent | Percent Total $P_2O_5$ in Unreacted MCP* | Pounds of Solvent Per Pound of Total $P_2O_5$ in Unreacted MCP | Reaction Temperature, °C. | Reaction Time, Hours | $P_2O_5$ Yield in Product Acid, Percent | Percent Impurity in Product Acid Containing 54 Percent $P_2O_5$ | | | |
|---|---|---|---|---|---|---|---|---|---|
| | | | | | | CaO | $Fe_2O_3$ | $Al_2O_3$ | MgO |
| Normal Octanol | 31.86 | 6.31 | 70 | 5.00 | 10.5 | 3.54 | 0.84 | 0.55 | 0.55 |
| Normal Octanol | 47.00 | 6.19 | 70 | 0.25 | 18.2 | 2.19 | 0.43 | 0.37 | 0.20 |
| | | | | 4.00 | 13.4 | <0.11 | 0.60 | 0.52 | — |
| 2-Ethyl Hexanol | 32.58 | 6.19 (First treatment) | 70 | 2.00 | 2.6 | <0.41 | 0.19 | 1.42 | — |
| | | 6.23 (Second treatment) | 70 | 2.00 | 2.5 | <0.43 | 0.03 | 0.87 | — |
| | | 6.20 (Third treatment) | 70 | 2.00 | 4.4 | <0.24 | 0.03 | 0.50 | — |
| CO-898** | 32.58 | 6.28 | 70 | 4.00 | 15.1 | 1.45 | 0.45 | 0.63 | 0.23 |
| Umbrex N*** | 32.58 | 6.32 | 70 | 4.00 | 7.2 | 3.17 | 0.44 | 1.70 | — |
| Normal Decanol | 31.86 | 6.25 | 70 | 4.00 | 28.0 | 9.13 | 0.04 | 0.84 | 0.35 |
| Normal Dodecanol | 31.86 | 6.12 | 70 | 4.00 | 6.4 | 15.73 | 1.15 | 1.72 | — |
| Acetone | 31.86 | 6.30 | 25 | 0.25 | 25.5 | <0.11 | 0.10 | 0.41 | — |
| | | | | 0.50 | 26.9 | <0.10 | 0.09 | 0.28 | — |
| | | | | 2.00 | 26.2 | <0.10 | 0.09 | 0.25 | — |
| | | | | 4.00 | 25.3 | <0.09 | 0.09 | 0.40 | — |
| | | | | 9.00 | 27.1 | <0.09 | 0.09 | 0.22 | — |
| Acetone | 31.86 | 6.42 | 50 | 0.25 | 27.1 | <0.12 | 0.12 | 0.29 | 0.17 |
| | | | | 0.50 | 29.9 | <0.09 | 0.11 | 0.22 | — |
| | | | | 2.00 | 28.6 | <0.10 | 0.10 | 0.34 | — |
| | | | | 7.00 | 28.2 | <0.10 | 0.08 | 0.20 | — |
| Methyl Butyl Ketone | 32.58 | 6.27 | 70 | 2.00 | 9.2 | 5.91 | 3.01 | 2.85 | — |
| Tetrahydrofuran | 31.86 | 6.30 | 55 | 0.25 | 29.0 | <0.10 | 0.08 | 0.33 | 0.07 |
| | | | | 0.50 | 25.4 | <0.10 | 0.08 | 0.33 | — |
| | | | | 4.00 | 25.6 | <0.09 | 0.09 | 0.28 | — |

*MCP containing 32 percent $P_2O_5$ was a slurry whereas MCP containing 47 percent $P_2O_5$ was a solid material.
**A commercial mixture of octanols.
***A commercial mixture of octanols and decanols.

Effect of Proportion of Solvent on Dissociation Reaction.

The proportion of methanol and acetone used for the dissociation reaction was studied and the results are shown in Tables II and III.

Table II shows that when the proportion of methanol was varied from 3.16 to 24.63 pounds of methanol per pound of $P_2O_5$ in the initial monocalcium phosphate, the yield of $P_2O_5$ in the product acid increased from 30.1% to 36.1% as the proportion of methanol increased. The impurity content of the acid decreased as the proportion of methanol increased. The filtration rate of the product acid increased as the proportion of methanol increased.

Table III shows that when the proportion of acetone was increased from 1.57 to 8.2 pounds of acetone per pound of $P_2O_5$ in the initial monocalcium phosphate, the $P_2O_5$ yield in the product acid increased from 17.0% to 36.1%, the impurity content of the acid decreased, and the filtration rate decreased.

Table II

Average $P_2O_5$ Yield, Average Impurity Concentration and Average Filtration Rate for Phosphoric Acid from the Dissociation of Crude Monocalcium Phosphate with Methanol at Different Solvent Ratios. (The Crude MCP Slurry Prepared from Florida Phosphate Rock Contained 32 Percent $P_2O_5$. Reaction and Filtration Temperature was 55° C).

| Pounds of Anhydrous Methanol per Pound of Total $P_2O_5$ in Unreacted MCP | Average $P_2O_5$ Yield in Product Acid*, Percent | Average Percent Impurity in Product Acid Containing 54% $P_2O_5$* | | | | | Average Filtration Rate*, lbs. of Filtrate $P_2O_5$/Hr/sqft of Filtration Area |
|---|---|---|---|---|---|---|---|
| | | CaO | $Fe_2O_3$ | $Al_2O_3$ | MgO | Total Major Cations | |
| 3.16 | 30.1 | 1.25 | 0.24 | 0.24 | 0.79 | 2.52 | 50 |
| 4.78 | 35.2 | 0.89 | 0.10 | 0.19 | 0.72 | 1.90 | 61 |
| 6.30 | 34.9 | 0.73 | 0.08 | 0.18 | 0.70 | 1.69 | 29 |
| 12.62 | 37.9 | 0.27 | 0.04 | 0.27 | 0.42 | 1.00 | 20 |
| 24.63 | 36.1 | <0.12 | 0.11 | 0.25 | 0.28 | <0.76 | 15 |

*"$P_2O_5$ Yield" and "Percent Impurity" represent the time averages over all dissociation reaction periods investigated for experimental runs using a certain set of conditions while "Filtration Rate" represents the time average for those experimental runs made using not more than one hour of dissociation reaction time.

Table III

Average $P_2O_5$ Yield, Average Impurity Concentration and Average Filtration Rate for the Phosphoric Acid from the Dissociation of Crude Monocalcium Phosphate with Acetone at Different Solvent Ratios. (The Crude Solid MCP Prepared from Florida Phosphate Rock Contained 47 Percent $P_2O_5$. Reaction and Filtration Temperature was 55° C.)

| Pounds of Acetone per Pound of Total $P_2O_5$ in Unreacted MCP | Average $P_2O_5$ Yield in Product Acid*, Percent | Average Percent Impurity in Product Acid Containing 54% $P_2O_5$* | | | | | Filtration Rate After Fifteen Minutes, Pounds of Filtrate $P_2O_5$ per Hour Per Square Foot of Filtration Area |
|---|---|---|---|---|---|---|---|
| | | CaO | $Fe_2O_3$ | $Al_2O_3$ | MgO | Total Major Cations | |
| 1.57 | 17.0 | 0.29 | 1.14 | 0.59 | 0.04 | 2.06 | 423 |
| 3.11 | 18.3 | <0.06 | 0.57 | 0.44 | 0.04 | <1.11 | 167 |
| 4.69 | 26.8 | <0.07 | 0.43 | 0.61 | 0.02 | <1.13 | 128 |
| 6.22 | 32.8 | <0.07 | 0.32 | 0.44 | 0.03 | <0.86 | 74 |
| 7.2 | 34.6 | — | — | — | — | — | — |
| 8.2 | 36.1 | — | — | — | — | — | — |

*"$P_2O_5$ Yield" and "Percent Impurity" represent the time averages over all dissociation reaction periods investigated for experimental runs using a certain set of conditions.

Effect of Repeated Treatment of Monocalcium Phosphate on Dissociation Reaction.

The effect of repeated treatment of the monocalcium phosphate with methanol and acetone was studied by subjecting the insoluble residue from the dissociation reation to treatment with fresh solvent. The results are shown in Table IV. It is seen that the cumulative % $P_2O_5$ yield in the product phosphoric acid increases with each subsequent treatment through a total of three stages. The solid residue from each stage would be correspondingly increased in dicalcium phosphate content and decreased in monocalcium phosphate content. The maximum conversion was about 90% of theoretical.

Table IV
EFFECT OF STAGEWISE DISSOCIATION OF MONOCALCIUM PHOSPHATE

| SOLVENT, 6# PER #$P_2O_5$ | NUMBER OF STAGES | % $P_2O_5$ YIELD IN ACID | |
|---|---|---|---|
| | | 32% $P_2O_5$ IN MCP | 47% $P_2O_5$ IN MCP |
| METHANOL | 1 | 34.9 | 29.3 |
| METHANOL | 2 | 40.6 | 39.8 |
| METHANOL | 3 | 41.6 | 44.7 |
| ACETONE | 1 | 28.5 | 32.8 |
| ACETONE | 2 | 32.4 | 40.1 |
| ACETONE | 3 | 35.7 | 45.8 |

Effect of Water Content of Monocalcium Phosphate on Dissociation.

Crude monocalcium phosphate slurry containing 31.9% $P_2O_5$ was dried to various degrees and treated with methanol. Monocalcium phosphate containing 31.9% and 35.0% $P_2O_5$ was a slurry, that containing 38.0% and 41.2% $P_2O_5$ was a paste, and that containing 44.0% $P_2O_5$ and higher was a solid material. The free water content and water of crystallization content of each material was calculated. The results are shown in Table V. The $P_2O_5$ yield in the product acid decreased slightly up to a monocalcium phosphate $P_2O_5$ content of 50.0% and then decreased sharply. The total impurity content of the acid (CaO + MgO + $Fe_2O_3$ + $Al_2O_3$), not shown in the table, decreased from 1.69% to 0.81% up to a monocalcium phosphate $P_2O_5$ content of 50%. It is significant that the product phosphoric acid from the treatment of monocalcium phosphate containing 50% $P_2O_5$ had a concentration of 54.4% $P_2O_5$, which corresponds to commercial grade phosphoric acid, and that this concentration was achieved directly from the dissociation step after removal of the solvent and without further concentration.

Table V
EFFECT OF WATER CONTENT OF SYSTEM ON DISSOCIATION OF MONOCALCIUM PHOSPHATE WITH METHANOL

| % $P_2O_5$ IN MCP | % $H_2O$ IN MCP* | | %$P_2O_5$ % $P_2O_5$ YIELD IN ACID | CONC. CONC. OF ACID, % $P_2O_5$ | FILTRATION RATE, #$P_2O_5$/ hr/ft$^2$ |
|---|---|---|---|---|---|
| | FREE | XST. | | | |
| 31.9 | 32.2 | 4.1 | 34.9 | 21.6* | 29 |
| 35.0 | 25.9 | 4.4 | 31.9 | 24.4* | 28 |
| 38.0 | 19.6 | 4.8 | 32.5 | 29.7* | 28 |
| 41.2 | 13.2 | 5.2 | 29.2 | 34.5* | 30 |
| 44.0 | 6.8 | 5.6 | 32.1 | 44.1* | 22 |
| 47.0 | 0.5 | 6.0 | 29.3 | 54.4 | 18 |
| 50.0 | 0.0 | 0.5 | 25.8 | 70.5* | 12 |
| 52.6 | 0.0 | 0.0 | 3.2 | — | — |
| 53.7 | 0.0 | 0.0 | 2.8 | — | — |
| 56.1 | 0.0 | 0.0 | 1.7 | — | — |

*Calculated

Simulated Continuous Operation of Process.

Operation of the variation of the process in which all of the dicalcium phosphate is recycled to the initial reaction and phosphoric acid is the only product that was carried out through three cycles of operation. This was done by using the dicalcium phosphate from a given cycle to produce additional phosphoric acid for use in the subsequent cycle. The results of tests with both methanol and acetone are shown in Table VI. The results show that the $P_2O_5$ yields and product acid compositions change little throughout the three cycles. This indicates that there would be no unfavorable build-up of impurities in the product acid in continuous operation.

Table VI

Crude and Product Phosphoric Acid Compositions and $P_2O_5$ Yields for Process Simulations Using Methanol and Acetone. (Crude Florida MCP Containing 47 Percent $P_2O_5$ was Dissociated at 55° C for 15 Minutes Using the Same Solvent Ratio for the Three Simulating Runs).

| Process Simulation | Crude Phosphoric Acid Composition Weight Percent | | | | | | Product Phosphoric Acid Composition Weight Percent | | | | | $P_2O_5$ Yield in Product Acid, Percent |
|---|---|---|---|---|---|---|---|---|---|---|---|---|
| | $P_2O_5$ | CaO | $Fe_2O_3$ | $Al_2O_3$ | MgO | F | $P_2O_5$ | CaO | $Fe_2O_3$ | MgO | F | |
| Solvent Ratio: 6.2 Pounds of Methanol per Pound of MCP $P_2O_5$ | | | | | | | | | | | | |
| First* | 28.30 | 0.04 | 1.16 | 0.43 | 0.28 | 1.81 | 54.41 | 0.49 | 0.07 | 0.08 | 0.26 | 0.35 | 32.3 |

Table VI-continued

Crude and Product Phosphoric Acid Compositions and $P_2O_5$ Yields for Process Simulations Using Methanol and Acetone. (Crude Florida MCP Containing 47 Percent $P_2O_5$ was Dissociated at 55° C for 15 Minutes Using the Same Solvent Ratio for the Three Simulating Runs).

| Process Simulation | Crude Phosphoric Acid Composition Weight Percent | | | | | | Product Phosphoric Acid Composition Weight Percent | | | | | | $P_2O_5$ Yield in Product Acid, Percent |
|---|---|---|---|---|---|---|---|---|---|---|---|---|---|
| | $P_2O_5$ | CaO | $Fe_2O_3$ | $Al_2O_3$ | MgO | F | $P_2O_5$ | CaO | $Fe_2O_3$ | $Al_2O_3$ | MgO | F | |
| Second** | 27.17 | 0.00 | 1.42 | 1.16 | 0.33 | 1.73 | 55.03 | 0.37 | 0.09 | 0.13 | 0.23 | 0.27 | 28.8 |
| Third** | 30.01 | 0.11 | 1.41 | 1.18 | 0.34 | 1.64 | 54.00 | 0.45 | 0.08 | 0.10 | 0.23 | 0.31 | 29.5 |
| Solvent Ratio: 1.6 Pounds of Acetone per Pound of MCP $P_2O_5$ | | | | | | | | | | | | | |
| First* | 28.30 | 0.04 | 1.16 | 0.43 | 0.28 | 1.81 | 51.61 | 0.04 | 0.87 | 0.39 | 0.19 | 0.16 | 15.0 |
| Second** | 29.93 | 0.16 | 1.32 | 1.18 | 0.37 | 1.83 | 52.46 | 0.04 | 0.95 | 0.43 | 0.24 | 0.19 | 15.8 |
| Third** | 29.79 | 0.15 | 1.51 | 1.32 | 0.31 | 1.73 | 52.82 | 0.05 | 0.79 | 0.34 | 0.18 | 0.17 | 17.0 |

*The crude phosphoric acids used in the first process simulations were prepared from sulfuric acid acidulation of Florida phosphate rock.
**The crude phoshporic acids used in the second and third process simulations were prepared from sulfuric acid acidulations of the dried filter cakes from the previous process simulations.

Composition of Product Phosphoric Acids.

The compositions of product phosphoric acids made from Florida phosphate rock and North Carolina phosphate rock by the solvent process and by current commercial processes are shown in Table VII. It is seen that the impurity contents of the solvent process acids are significantly lower than those of the commercial acids.

Applicability of the Process of Low Grade Phosphates.

Preparation of relatively pure phosphoric acid from low grade phosphatic raw materials was demonstrated in the following experiment. A phosphatic slimes material rejected from the beneficiation of Florida phosphate rock was used. The phosphate slimes contained 14.30% $P_2O_5$, 18.23% CaO, 2.42% $Fe_2O_3$, 11.81% $Al_2O_3$ and 39.45% $SiO_2$. The phosphate slimes was treated with sulfuric acid and filtered to produce a crude phosphoric acid, which was then reacted with additional phosphate slimes to produce a monocalcium phosphate slurry, as in the preceding examples. The slurry was concentrated by drying to a $P_2O_5$ content of 41.2% and dissociated with both methanol and acetone, in the proportion of 6.2 pounds of solvent per pound of $P_2O_5$.

When methanol was used, the impurity contents of the phosphoric acid produced (calculated to a 54% $P_2O_5$ basis) were as follows: 0.51% CaO, 0.41% MgO, 0.21% $Fe_2O_3$ and 0.91% $Al_2O_3$. The yield of $P_2O_5$ as product acid was 27.4% of that in the monocalcium phosphate.

When acetone was used, the impurity contents of the phosphoric acid produced were 0.06% CaO, 0.05% MgO, 0.61% $Fe_2O_3$ and 1.21% $Al_2O_3$. The yield of $P_2O_5$ as product acid was 30.2% of the $P_2O_5$ in the monocalcium phosphate.

Comparing the total impurity contents of the acids made from the phosphate slimes with those made from high grade phosphate rock (Tables II, III and VII), it is seen that the total impurity contents are of the same order of magnitude. The $P_2O_5$ yields from the phosphate slimes were only slightly lower than those obtained from high grade phosphate rock.

These results demonstrate that the process can produce low impurity phosphoric acid in good yields from very low grade phosphatic materials.

Table VII.

| #Solvent Per #P205 | Composition Of Acid, Basis 54% $P_2O_5$ | | | | | |
|---|---|---|---|---|---|---|
| | CaO | $Fe_2O_3$ | $Al_2O_3$ | MgO | F | $SO_4$ |
| Florida Rock: | | | | | | |
| 6.0 Methanol | 0.4 | 0.08 | 0.10 | 0.25 | 0.3 | 0.00 |
| 3.0 Acetone | 0.05 | 0.5 | 0.4 | 0.05 | 0.2 | 0.00 |

Table VII.-continued

| #Solvent Per #P205 | Composition Of Acid, Basis 54% $P_2O_5$ | | | | | |
|---|---|---|---|---|---|---|
| | CaO | $Fe_2O_3$ | $Al_2O_3$ | MgO | F | $SO_4$ |
| Commercial | 0.10 | 1.1 | 1.1 | 0.6 | 0.1 | 3.0 |
| North Carolina Rock: | | | | | | |
| 6.0 Methanol | 0.66 | 0.10 | 0.26 | 0.50 | — | 0.00 |
| 1.6 Acetone | <0.07 | 0.97 | 0.32 | 0.08 | — | 0.00 |
| Commercial | 0.10 | 1.40 | 1.00 | 1.10 | 0.7 | 3.1 |

Production of Impure Dicalcium Phosphate as Sole Product.

Crude monocalcium phosphate was dissociated with 6 pounds of methanol per pound of $P_2O_5$. The resultant solid residue had the composition: 46.0% total $P_2O_5$, 0.18% citrate-in-soluble $P_2O_5$ and 27.7% water-soluble $P_2O_5$. The high water-soluble $P_2O_5$ content indicates that the product contains considerable undissociated monocalcium phosphate. For some fertilizer purposes this would be desirable. For others it would be better to have a lower content of monocalcium phosphate; this could be achieved by the use of one or more subsequent dissociation steps.

Production of Impure Dicalcium Phosphate Containing Gypsum as the Sole Product The process operating with impure dicalcium phosphate as the sole product was simplified by eliminating the removal of gypsum from the initial reactions and allowing it to proceed through the process mixed with the monocalcium phosphate and dicalcium phosphate. This would reduce operating cost but would also lower the $P_2O_5$ content of the solid product. Accordingly phosphate rock was reacted with sulfuric acid and recycled crude phosphoric acid in such proportion to produce a mixture of monocalcium phosphate and calcium sulfate, dissociating the monocalcium phosphate content of the reaction product with 6 pounds of methanol per pound of $P_2O_5$, and separating the solid residue. The dried product from this test contained 17.2% total $P_2O_5$, 2.8% citrate-insoluble $P_2O_5$, 8.5% water-soluble $P_2O_5$ and 30.8% CaO. The phosphoric acid produced would all be recycled to the initial acidulation step. Such a product would be a very satisfactory fertilizer, and would be economical where long distance shipping is not required.

Having now fully described the invention, it will be apparent to one of ordinary skill in the art that many changes and modifications can be made thereto without departing from the spirit or scope of the invention as set forth therein.

What is claimed is:

1. A process for producing phosphoric acid which comprises reacting aqueous sulfuric acid having from 50% to 100% by weight sulfuric acid with a recycled dicalcium phosphate material and with phosphatic raw material, selected from the group consisting of raw phosphate rock ore, phosphate rock concentrates, phosphatic by-products and phosphatic waste materials from phosphate rock beneficiation, to produce a mixture of phosphoric acid, calcium sulfate and impurities, separating the calcium sulfate and impurities therefrom to leave phosphoric acid, impurities, and water, comingling the phosphoric acid, impurities and water with additional phosphatic raw material to form an aqueous slurry of monocalcium phosphate, reducing the water in said slurry to a content of from 0.3% to 20% by weight, treating said monocalcium phosphate thus produced with an organic solvent in which phosphoric acid is soluble and dicalcium phosphate is less soluble to effect dissociation of the monocalcium phosphate into phosphoric acid and an insoluble residue containing dicalcium phosphate, separating the solution of said phosphoric acid in the organic solvent from said insoluble resin containing dicalcium phosphate, separating the organic solvent from said phosphoric acid separating the occluded organic solvent from the residue, recycling the organic solvent to the dissociation step, and recycling the insoluble residue containing dicalcium phosphate to the initial step in the process as said recycled dicalcium phosphate material.

2. The process of claim 1, wherein the step of reducing the water includes evaporating of the water before treatment of the monocalcium phosphate with the organic solvent.

3. The process of claim 1, wherein the organic solvent is selected from the group consisting of methanol ethanol, acetone, n-propanol, n-butanol, 3-methyl butanol, n-hexanol, 2-ethyl hexanol, methyl n-butyl ketone, tetrahydrofuran and mixtures thereof.

4. The process of claim 1, wherein the organic solvent is separated from phosphoric acid by distillation.

5. The process of claim 1, wherein the step of treating said monocalcium phosphate with organic solvent includes, in separate stages, subjecting the monocalcium phosphate to successive amounts of fresh solvent so that the amount of monocalcium phosphate in the insoluble residue is successively decreased in each stage and the dicalcium phosphate in the insoluble residue is correspondingly increased in each stage.

6. The process of claim 1 wherein the step of treating said monocalcium phosphate with an organic solvent includes first evaporating a selected amount of water from said slurry of monocalcium phosphate to reduce said water to the desired content by weight and then reacting the residue with said organic solvent.

7. A process for producing dicalcium phosphate which comprises reacting aqueous sulfuric acid having from 50% to 100% by weight sulfuric acid with phosphatic raw material, selected from the group consisting of raw phosphate rock ore, phosphate rock concentrates, phosphatic by-products and phosphatic waste materials from phosphate rock beneficiation, to produce a mixture of phosphoric acid, calcium sulfate and impurities, separating the calcium sulfate and impurities therefrom to leave phosphoric acid, impurities and water, comingling the phosphoric acid, impurities and water with additional phosphatic raw material and with recycled phosphoric acid to form an aqueous slurry of monocalcium phosphate, reducing the water in said slurry to a content of from 0.3% to 20% by weight, treating said monocalcium phosphate thus produced with an organic solvent in which phosphoric acid is soluble and dicalcium phosphate is less soluble to effect dissociation of the monocalcium phosphate into phosphoric acid and an insoluble residue containing dicalcium phosphate, separating the solution of said phosphoric acid in the organic solvent from said insoluble residue containing dicalcium phosphate, separating the organic solvent from said phosphoric acid, recycling the organic solvent to the dissociation step, and recycling the phosphoric acid to the step of monocalcium phosphate production as said recycled phosphoric acid, the ratio of said sulfuric acid (basis 100% $H_2SO_4$) to the phosphorus expressed as $P_2O_5$ of the total of said phosphatic raw material and said additional phosphatic raw material being between about 0.97 pounds of sulfuric acid per pound of $P_2O_5$ and 1.50 pounds of sulfuric acid per pound of $P_2O_5$.

8. The process of claim 7, wherein, the step or reducing the water includes evaporating of the water before treatment of the monocalcium phosphate with the organic solvent.

9. The process of claim 7, wherein the organic solvent is selected from the group consisting of methanol, ethanol, acetone, n-propanol, n-butanol, 3-methyl butanol, n-hexanol, 2-ethyl hexanol, methyl n-butyl ketone, tetrahydrofuran and mixtures thereof.

10. The process of claim 7, wherein the organic solvent is separated from phosphoric acid by distillation.

11. The process of claim 7, wherein the step of treating said monocalcium phosphate with organic solvent includes, in separate stages, subjecting the monocalcium phosphate to successive amounts of fresh solvent so that the amount of monocalcium phosphate is the insoluble residue is successively decreased in each stage and the dicalcium phosphate in the insoluble residue is correspondingly increased in each stage.

12. The process of claim 7 wherein the step of treating said monocalcium phosphate with an organic solvent includes first evaporating a selected amount of water from said slurry of monocalcium phosphate to reduce said water to the desired content by weight and then reacting the residue with said organic solvent.

13. In a continuous process of producing an impure dicalcium phosphate, the steps of:
  (a) reacting recycled phosphoric acid and concentrated sulfuric acid having from 50% to 100% by weight sulphuric acid with phosphatic raw material to produce a mixture containing monocalcium phosphate, calcium sulfate, impurities and water;
  (b) treating said mixture with recycled organic solvent in which phosphoric acid is soluble and dicalcium phosphate is less soluble to effect dissociation of the monocalcium phosphate into phosphoric acid and an insoluble residue containing dicalcium phosphate and calcium sulfate;
  (c) separating the solution of said phosphoric acid in the organic solvent from said insoluble residue containing dicalcium phosphate and calcium sulfate;
  (d) separating the organic solvent from said phosphoric acid;
  (e) recycling the phosphoric acid thus produced to form the recycled phosphoric acid of step (a) thereof; and (f) recycling said organic solvent to form the recycled organic solvent of step (b) thereof;

(g) the ratio of said sulfuric acid(basis 100% $H_2SO_4$) to the phosphorus content expressed as $P_2O_5$ of the total of said phosphatic raw material and said additional phosphatic raw material being between about 0.97 pounds of sulfuric acid per pound of $P_2O_5$ and 1.76 pounds of sulfuric acid per pound of $P_2O_5$.

* * * * *